(12) United States Patent
Zahrah et al.

(10) Patent No.: US 6,402,500 B1
(45) Date of Patent: Jun. 11, 2002

(54) FLUIDIZED FILLSHOE SYSTEM

(75) Inventors: Tony F. Zahrah, Fairfax, VA (US); Rajkumar Raman, Waldorf, MD (US); Phillip A. Parrish; Roderick Rowland, both of Fairfax, VA (US)

(73) Assignee: Matsys, Springfield, VA (US)

( * ) Notice: Subject to any disclaimer, the term of this patent is extended or adjusted under 35 U.S.C. 154(b) by 0 days.

(21) Appl. No.: 09/418,502

(22) Filed: Oct. 15, 1999

Related U.S. Application Data

(63) Continuation-in-part of application No. 08/964,128, filed on Nov. 6, 1997, now abandoned.

(51) Int. Cl.⁷ ............................................... B29C 67/08
(52) U.S. Cl. .......................... 425/448; 406/50; 406/91; 406/127; 141/67
(58) Field of Search .............................. 406/25, 50, 91, 406/127, 130, 131, 138; 141/67, 630, 394, 395, 396; 425/254, 260, 344, 448, 449, 78

(56) References Cited

U.S. PATENT DOCUMENTS

| | | | |
|---|---|---|---|
| 1,759,983 A * | 5/1930 | Houston | 406/91 |
| 3,176,369 A | 4/1965 | Dennis et al. | 425/254 |
| 3,647,333 A | 3/1972 | Smith | 425/78 |
| 3,788,787 A | 1/1974 | Silbereisen et al. | 425/260 |
| 3,832,107 A | 8/1974 | Cox et al. | 425/78 |
| 3,995,771 A * | 12/1976 | Olivier | 406/90 |
| 4,591,324 A * | 5/1986 | Kubota | 425/222 |
| 4,599,215 A | 7/1986 | Smarsly et al. | 419/38 |
| 4,841,884 A | 6/1989 | Engstrom et al. | 110/298 |
| 4,859,073 A | 8/1989 | Howseman, Jr. et al. | 366/195 |
| 4,970,804 A | 11/1990 | Huttlin | 34/589 |
| 5,000,624 A * | 3/1991 | Steiger | 406/124 |
| 5,017,754 A * | 5/1991 | Drouet et al. | 219/121.36 |
| 5,096,096 A | 3/1992 | Calaunan | 222/195 |
| 5,143,486 A | 9/1992 | Geoffroy | 406/90 |
| 5,213,816 A | 5/1993 | Smyth, Jr. et al. | 425/78 |
| 5,400,921 A | 3/1995 | Smith, Jr. et al. | 222/1 |
| 5,469,994 A | 11/1995 | Reh et al. | 222/630 |
| 5,615,830 A | 4/1997 | Matsunaga et al. | 239/8 |

* cited by examiner

Primary Examiner—Tim Heitbrink
Assistant Examiner—Thu Khanh T. Nguyen
(74) Attorney, Agent, or Firm—Millen, White, Zelano & Branigan, P.C.

(57) ABSTRACT

A delivery and filling system for filling a cavity with a particulate material is disclosed. The system in one embodiment includes a hopper; a transport device, and a delivery chute. The hopper, transport device, and delivery chute each may have a porous distributor plate which partitions them into a first chamber and a second chamber. The system is hooked to a compressed gas source connected to the porous distributor plate and a fluidizer. A gas-control unit is provided including a pressure regulator, pressure sensor, and flow metering solenoid valve to independently regulate the flow of gas to the porous distributor plate and the fluidizer of the system independently.

6 Claims, 11 Drawing Sheets

INDIVIDUAL
FLUIDIZER

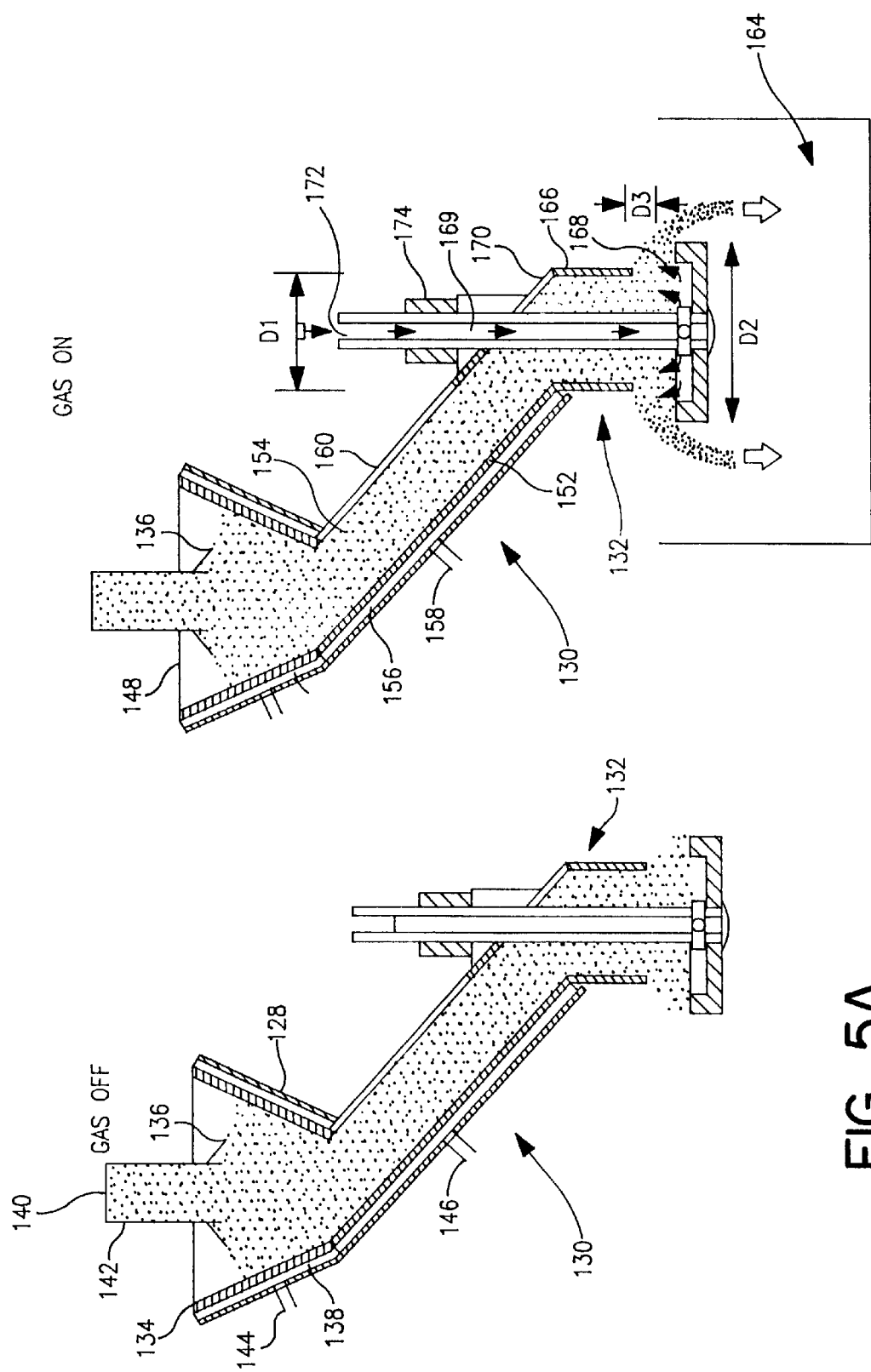

FLUIDIZED FILLSHOE SYSTEM

CROSS REFERENCE TO RELATED APPLICATIONS

This application is a continuation-in-part application of U.S. patent application Ser. No. 08/964,128, Entitled "Powder Delivery System For Die Filling", filed Nov. 6, 1997 now abandoned. Applicants claim priority thereto pursuant to 35 USC Section 120.

BACKGROUND OF THE INVENTION

1. Field of the Invention

The invention relates in general to techniques and apparatus for delivering particulate material and filling cavities in a uniform and consistent manner during successive filling operations. The invention relates in particular to powder delivery systems for delivering particulate material and filling closed cavities, such as die cavities of die-casting machines, and for filling open cavities, such as containers on food packaging production lines.

2. Description of the Related Art

Powder delivery systems are used for delivering particulate material and filling die cavities of, e.g., die-casting machines prior to powder compaction in processes for fabricating consolidated parts for automotive, aerospace, micro-electronics, pharmaceuticals vitamins, etc. Powder typically is gravity-fed from a main hopper to the, die cavity by transfer through a flexible tube to a feedshoe or fillshoe, which deposits powder into the die cavity. The process of depositing powder in the die cavity is called "die filling."

The process of powder delivery and filling by gravity is the most common way of delivering powder and filling a die cavity. The feedshoe is pushed forward between the surface of the die cavity and a top punch, and positioned on top of the die cavity. Depending on powder flow characteristics, cavity shape and size, type of die-casting machine, and filling method, the feedshoe is typically mechanically vibrated while on top of the die cavity to loosen the powder, break any clumps and ensure that the die cavity is full before the feedshoe is retracted.

There are several problems associated with prior art processes for powder delivery and filling of a die cavity.

One such problem is variation in filling conditions during successive filling operations, i.e. from part to part. Variations in filling conditions from part to part result in variations in weight from part to part, and a non-uniform fill of the die cavities. A non-uniform fill results in variations in density between the front and back of the part and in distortion of the part during sintering. Typically, part specifications include limits on acceptable variations in part weight and on acceptable variations in density within the part. Parts that do not meet the specifications are rejected.

The variations in filling conditions from part to part are due, in part, to variations in head pressure, clumping, surge, and dead zones of material within the feedshoe. The head pressure is due to the powder in the feedshoe, the flexible tube and the main hopper. As a result of the powder delivery system design, wherein the flexible tube is typically connected to the backside of the feedshoe, the powder in the back of the die cavity is subjected to a higher head pressure than the front of the die cavity.

During operation, the feedshoe is pushed forward and centered above the die cavity and then retracted before compacting. The movement of the feedshoe across the die cavity results in the back of the die cavity being subjected to the higher head pressure for a longer period of time than the front of the die cavity. These effects combine to produce variations in part density between the back and the front of the part, which result in distortion during sintering.

Clumping and surge of the powder within the feedshoe and flexible tube contributes to non-uniform filling of die cavities. Mechanical shaking of the feedshoe above the die cavity can break clumping in the powder and improve fill uniformity but is not consistent during successive filling operations.

A further problem results from fine powders/particulate materials, which do not have good flow characteristics, thus posing a serious problem for the die filling operation. Lubricants are added to reduce interparticle friction and improve flowability, thereby requiring an energy intensive delubing cycle after compacting to remove all added lubricants.

A further problem is that mechanical shaking of the feedshoe causes segregation of fine powders/particulate materials from coarse powders/particulate materials resulting in a loss of uniformity in particle size distribution and chemical composition. This powder segregation results in powders with different apparent densities and chemical composition being filled in the die cavity during successive powder filling operations.

A solution to these and other problems is needed. Such solution is provided by the novel invention recited herein.

BRIEF SUMMARY OF THE INVENTION

The invention contemplates supplying a technique land apparatus for delivering particulate material and filling cavities in a uniform and consistent manner during successive filling operations. In preferred embodiments, the invention provides a powder delivery system for delivering particulate material and filling closed cavities, such as the closed die cavities of die-casting machines; or for filling open cavities, such as open containers on food packaging production lines.

Die Casting and Sintering

The three basic steps for producing parts by the press and sinter process are mixing, compacting and sintering. In step one, mixing, elemental or prealloyed powders are mixed with lubricants or other alloy additions to produce a homogeneous mixture of ingredients. The lubricant reduces interparticle friction and improves the flow characteristics of the powder mixture. In step two, compacting, mixed powder is fed into a precision die on a die-casting machine and is compacted. Compacting the loose powder produces a "green compact" which has the size and shape of the finished part when ejected from the die. In step three, sintering, the green compacts are placed on a wide-mesh belt and slowly moved through a controlled atmosphere furnace. The parts are heated to below the melting point of the base material, held at the sintering temperature, and then cooled.

Tabletting and Dry Compaction

The production of pharmaceutical preparations, e.g. vitamins, or tablets containing an active medicament in a carrier or other suitable excipient, requires precise and homogeneous mixation techniques. Similarly, candies usually must have an acceptable hardness, mouthfeel, and duration within the mouth. These characteristics can depend in part upon the homogeneity of the composition in the tablet form.

Dry powder, or a semidry paste, is placed within a tablet mold and subjected to pressure. The amount of pressure usually determines the hardness of the tablet, and consequently its lifetime within the mouth (subject, of course, to chewing). It is important for dosage amount and appearance that the powder feed correctly into the tabletting machine.

The Closed Cavity Device

In one embodiment, the invention provides a method and apparatus for powder delivery and filling of a closed cavity, such as a die cavity of a die-casting machine. The apparatus includes a mini-hopper, a transport device, a delivery chute and a gas control unit.

The mini-hopper has a porous distributor plate for partitioning the mini-hopper into a first partition in which the bed of particulate material is stored and a second partition separate from the first partition and in communication with the first partition via the porous distributor plate. An inlet port is provided for receiving a compressed gas in the second partition at a low pressure, whereby only the bottom surface of the bed of particulate material becomes fluidized by migration of the compressed gas through the porous distributor plate and into the first partition.

The transport is connected to the side of the mini-hopper and delivers powder/particulate material from the mini-hopper to the delivery chute. The transport has a porous distributor plate for partitioning the transport into a first partition in which the particulate material flows and a second partition separate from the first partition and in communication with the first partition via the porous distributor plate.

The delivery chute can function as the powder discharge unit directly above the die cavity. Fluidizers are embedded in the delivery chute to ensure that the powder is fluidized before filling the die cavity. The delivery chute is customized to part shape to optimize fill performance for individual parts or a family of parts, depending on part size and shape complexity.

An in-line dryer may be provided to remove moisture from the gas supply, while an in-line filter may be used to remove solid impurities in the gas supply. The gas control unit can include three independent pressure regulators, located in a separate housing, and three pneumatic solenoids, which are used to regulate the flow of gas to each segment of the fillshoe independently. The solenoids are preferably timed to control fluidization of the powder over the die cavity.

The apparatus in one embodiment provides for venting of gas in each segment of the fillshoe to prevent build up of pressure within the system and in the die cavity, which will prevent uniform, complete and consistent filling of die cavities. The apparatus also preferably provides for collection of any fine powder particles that may escape through the venting screens.

The apparatus in a particularly preferred embodiment has a low profile, fits on a compacting press, and can be pushed into position between the die surface and top punch of a die-casting machine during die filling operation.

The apparatus for filling closed cavities is preferably easily movable. The apparatus is pushed forward into position above a die cavity for filling and then retracted after filling and before compacting. The low profile apparatus for filling closed cavities can be positioned between the die surface and top punch of a die-casting machine.

The Open Cavity Filling Device

The invention, in another preferred embodiment, provides a method and apparatus for powder delivery and filling of an open cavity, such as a container on food packaging production lines. The apparatus for filling open cavities is preferably stationary, although it may be moved for adjustment purposes or to accommodate packagings of various sizes on a continuous production line.

The apparatus in one embodiment includes a mini-hopper, a transport, a delivery chute and a gas control unit.

The mini-hopper can function as an intermediate storage unit for powder and is configured to receive powder from the main hopper. The mini-hopper has specially designed porous distributor plates for partitioning the mini-hopper into a first partition in which the bed of particulate material is stored and a second partition separate from the first partition and in communication with the first partition via the porous distributor plate.

An inlet port is provided for receiving a compressed gas in the second partition at a low pressure, whereby only a layer of particulate material next to the porous distributor plates becomes fluidized by migration of the compressed gas through the porous distributor plates and into the first partition.

The transport delivers powder/particulate material from the mini-hopper to the delivery chute. The transport has a porous distributor plate for partitioning the transport into a first partition in which the particulate material flows and a second partition separate from the first partition and in communication with the first partition via the porous distributor plate. An inlet port is provided for receiving a compressed gas in the second partition at a low pressure, whereby only the bottom layer of the particulate material becomes fluidized by migration of the compressed gas through the porous distributor plate and into the first partition.

The delivery chute preferably has a center fluidizer which is used to regulate powder flow and meter the amount of powder. This can be accomplished, e.g., by the use of a timer and turning the gas flow on and off. The delivery chute can act as a fluidized powder valve by preventing powder flow once the gas is turned off.

The gas control unit is used to control the gas moisture content and regulate powder fluidization and powder flow in relation to the movement of the production/filling line.

In a preferred embodiment, an in-line dryer removes moisture from the gas supply. An in-line filter is also preferably used to remove solid impurities in the gas supply. The gas control unit is used to control the gas moisture content and regulate powder fluidization in relation to the movement of the production line.

The gas control unit in one embodiment includes three independent pressure regulators, located in a separate housing, and three pneumatic solenoids, which are used to regulate the flow of gas to each segment of the fillshoe independently. The solenoids are timed to control fluidization of the powder over the open container on a production line. When the gas to the fluidized powder valve is turned on, particulate material flows into the open container. When the gas to the fluidized powder valve is turned off, the flow of particulate material is cut-off immediately.

A timer is preferably used to regulate the time at which the gas to the fluidized powder valve is turned on and off, providing an accurate way of metering particulate material for filling a container or an open cavity.

OBJECTS OF THE INVENTION

It is therefore an object of this invention to provide a new method and apparatus for powder filling of a die cavity.

It is a further object of this invention to provide an apparatus with a low profile that can be fitted on a die-casting machine between the die surface and the top punch of the die-casting machine.

It is a further object of the invention to provide a method and apparatus for powder delivery and consistent filling of a die cavity from the feedshoe during successive filling operations.

It is a further object of the invention to provide a method and apparatus for powder delivery and consistent filling of a die cavity which improves uniformity of fill of the die cavity from the feedshoe.

It is a further object of the invention to provide a method and apparatus for powder delivery to a die cavity which reduces or eliminates segregation of fine particles from coarse particles and which maintains uniformity in chemical composition.

It is a further object of the invention to provide a method and apparatus for powder delivery and filling of a die cavity which enhances the flowability of fine powders/particulate materials.

It is a further object of the invention to provide a method and apparatus for powder delivery and filling of a cavity for forming tablets, which apparatus enhances the flowability of fine powders/particulate materials.

It is a further object of the invention to provide a method and apparatus for powder delivery and filling of a die cavity which reduces or eliminates the need for using organic binders to adhere the fine particles with the coarse particles to prevent particle segregation.

It is a further object of the invention to provide a method and apparatus for powder delivery to a die cavity, which minimizes or eliminates the need to use a lubricant.

The foregoing and other objects, features, and advantages of the invention will be apparent to the skilled artisan having regard for this disclosure. The examples which follow are intended to serve as illustrative and not by way of limitation.

BRIEF DESCRIPTION OF THE DRAWINGS

FIG. 5A is a cross-sectional view of an embodiment of the invention configured for filling open cavities, showing the powder lock when the gas is off.

FIG. 5B is a cross-sectional view of an embodiment of the invention configured for filling open cavities, showing the powder flowing when the gas is on.

DETAILED DESCRIPTION OF THE PREFERRED EMBODIMENTS

Figure 1A:
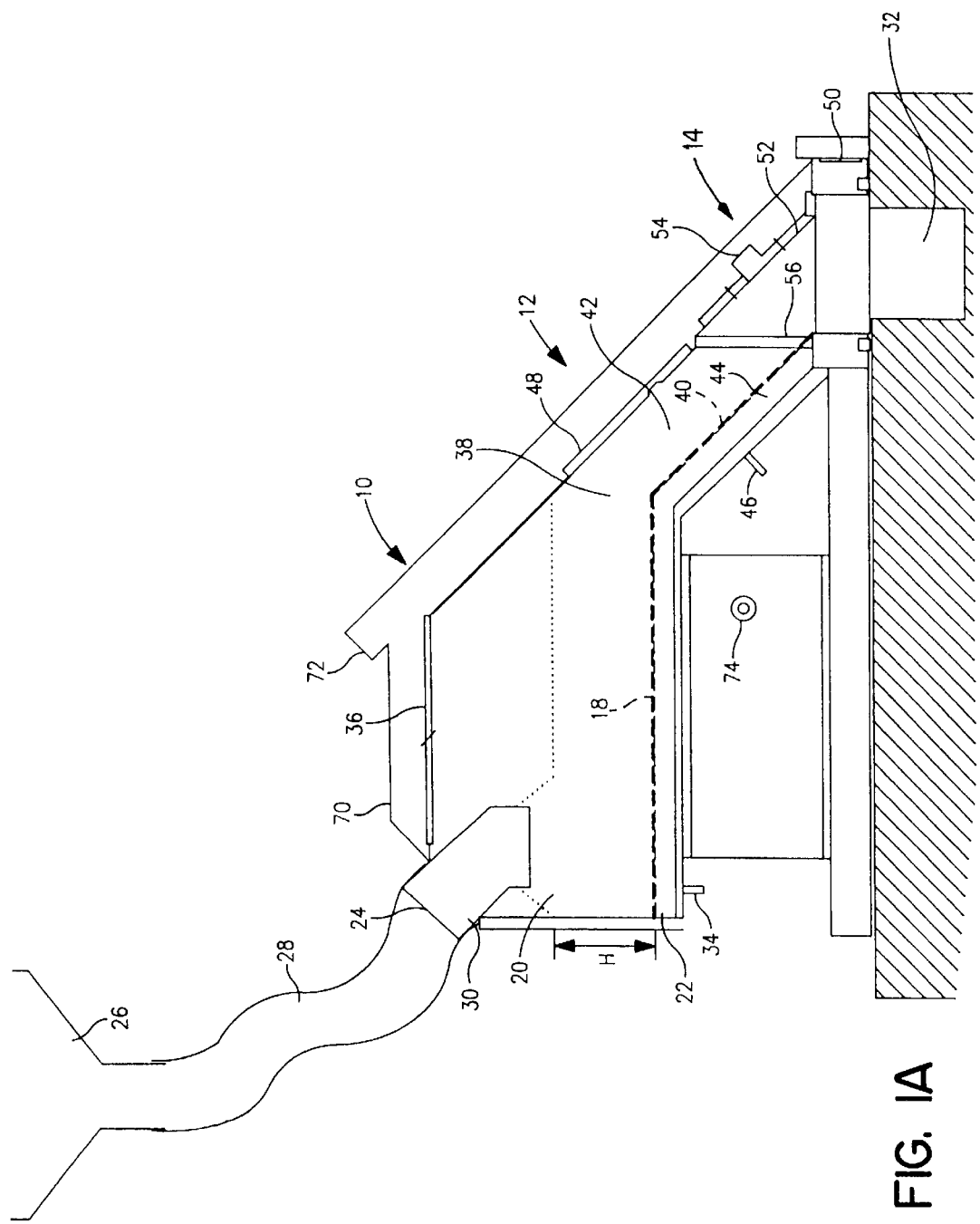
FIG. 1A shows a cross-sectional view of an exemplary apparatus for filling closed cavities according to a preferred embodiment.

The following description of preferred embodiments is meant to be read in conjunction with the accompanying drawings, in which reference characters refer to the same parts throughout the various views. The drawings are not necessarily to scale, emphasis instead is being placed upon illustrating principles of the invention. The drawings serve merely to illustrate the invention, and are not meant to limit it in scope in any way.

The present invention provides a method and apparatus for powder delivery and filling of cavities in general, said cavities being used for sintering, casting, die casting, tabletting, or other forms of powder use including metallurgy, or other industrial, manufacturing, distributing, or other uses. For ease of description, the below occasionally references a preferred embodiment, pressing and sintering, but it is clear to the skilled artisan that many uses for the instant invention will be apparent without departing from the spirit and claims of the instant disclosure.

Powder Processes Generally

There are three basic steps for producing parts by a technique of pressing, or pressing and sintering.

Initially, the components of the composition to be made into a part are mixed. Mixing should be uniform to ensure that the resultant part has a homogeneous structure and no large agglomerations of particles or voids are present. The components may be powders, granules, prealloyed particulates, particles made by any of several known techniques—air atomization, water atomization, or the like.

The components may be uniform or irregular; in any event the primary object is to ensure a uniform dispersion, while mixing and also while being transported to the die casting machine. In this step, mixing, elemental or prealloyed powders may be mixed with lubricants or other alloy additions to produce a homogeneous mixture of ingredients. The lubricant reduces interparticle friction and improves the flow characteristics of the powder mixture.

The powder or the like is then subjected to compacting, wherein mixed powder is fed into a rough cut or precision die on a die-casting, tabletting, or other machine and is compacted. Compacting the loose powder produces a "green compact" which has the size and shape of the finished part when ejected from the die. It is important that the component powder subjected to the compaction is uniformly distributed in the die or mold and homogeneous. If a tablet is being produced, this is frequently the last step if no further processes are necessary, e.g. coating or the like.

During sintering, the so-called "green compacts" are placed on a wide-mesh belt and slowly moved through a controlled atmosphere furnace. The parts are heated to below the melting point of the base material, held at the sintering temperature, and then cooled.

Other forms of metallurgy, e.g. the production of various alloys; or the production of ceramic metal (cermet)

materials, require a similarly homogeneous dispersion of materials within a binder, lube, other carrier, or no carrier. The apparatus and method of the instant invention ensures such a dispersion.

The Closed Cavity Apparatus and Process

In one version of the invention, the cavity to be filled is a closed cavity, such as a die cavity of a die-casting machine or the tablet forming plate of a tabletting machine.

The apparatus contains a mini-hopper, a transport device, a delivery chute and a gas control unit. The mini-hopper may function as an intermediate storage unit for powder and is configured to receive powder from the main hopper. The mini-hopper provides isolation of the fillshoe from the main powder hopper and regulates powder pressure head during the filling operation.

The mini-hopper has a porous distributor plate for partitioning the mini-hopper into a first partition in which the bed of particulate material is stored and a second partition separate from the first partition and in communication with the first partition via the porous distributor plate.

An inlet port is provided for receiving a compressed gas in the second partition at a low pressure, whereby only the bottom surface of the bed of particulate material becomes fluidized by migration of the compressed gas through the porous distributor plate and into the first partition.

The transport is connected to the side of the mini-hopper and delivers powder/particulate material from the mini-hopper to the delivery chute. The transport has a porous distributor plate for partitioning the transport into a first partition in which the particulate material flows and a second partition separate from the first partition and in communication with the first partition via the porous distributor plate.

The delivery chute may function as the powder discharge unit directly above the die cavity. Fluidizers are preferably embedded in the delivery chute to ensure powder is fluidized before filling the die cavity. The delivery chute is customized to part shape to optimize fill performance for individual parts or a family of parts, depending on part size and shape complexity.

For example, one center fluidizer is used for large ring-shaped parts, and functions as a passive (no moving component) powder valve when the gas is turned on and off. Several small fluidizers are used for gear-shaped parts, and are positioned above gear lightening holes. A ring fluidizer is used for powders with poor flow characteristics and to increase fill speed.

The gas control unit is used to control the gas moisture content and regulate powder fluidization in relation to the movement of the fillshoe on the die-casting machine. An in-line dryer preferably removes moisture from the gas supply, and preferably an in-line filter is used to remove solid impurities in the gas supply.

In this embodiment, the gas control unit includes three independent pressure regulators, located in a separate housing, and three pneumatic solenoids, which are used to regulate the flow of gas to each segment of the fillshoe independently. The solenoids are timed to control fluidization of the powder over the die cavity.

The apparatus provides for venting of gas in each segment of the fillshoe to prevent build up of pressure within the system and in the die cavity, which will prevent uniform, complete and consistent filling of die cavities. The apparatus also provides for collection of any fine powder particles that may escape through the venting screens. The apparatus has a low profile, fits on a compacting press, and can be pushed into position between the die surface and top punch of a die-casting machine during die filling operation.

The Open Die or Container Apparatus and Process

The invention also provides a method and apparatus for powder delivery and filling of an open cavity, such as a container on food packaging production lines.

The apparatus in this embodiment likewise consists of a mini-hopper, a transport, a delivery chute and a gas control unit.

The mini-hopper again may function as the intermediate storage unit for powder and receives powder from the main hopper. The mini-hopper has specially designed porous distributor plates for partitioning the mini-hopper into a first partition in which the bed of particulate material is stored and a second partition separate from the first partition and in communication with the first partition via the porous distributor plate.

An inlet port is provided for receiving a compressed gas in the second partition at a low pressure, whereby only a layer of particulate material next to the porous distributor plates becomes fluidized by migration of the compressed gas through the porous distributor plates and into the first partition. The special design for the porous plates is required because of the very poor flow characteristics of food, vitamins, and similar products.

The transport device delivers powder/particulate material from the mini-hopper to the delivery chute. The transport device has a porous distributor plate for partitioning the transport into a first partition in which the particulate material flows and a second partition separate from the first partition and in communication with the first partition via the porous distributor plate.

An inlet port is provided for receiving a compressed gas in the second partition at a low pressure, whereby only the bottom layer of the particulate material becomes fluidized by migration of the compressed gas through the porous distributor plate and into the first partition.

The delivery chute has a center fluidizer which is used to regulate powder flow and meter the amount of powder with the use of a timer and turning the gas flow on and off. The delivery chute acts as a fluidized powder valve.

The gas control unit is used to control the gas moisture content and regulate powder fluidization and powder flow in relation to the movement of the production/filling line. Preferably, an in-line dryer removes moisture from the gas supply and an in-line filter is used to remove solid impurities in the gas supply.

The gas control unit in this embodiment is used to control the gas moisture content and regulate powder fluidization in relation to the movement of the production line. The gas control unit includes three independent pressure regulators, located in a separate housing, and three pneumatic solenoids, which are used to regulate the flow of gas to each segment of the fillshoe independently.

The solenoids are timed to control fluidization of the powder over the open container on a production line. When the gas to the fluidized powder valve is turned on, particulate material flows into the open container. When the gas to the fluidized powder valve is turned off, the flow of particulate material is cut-off immediately. A timer is used to regulate the time at which the gas to the fluidized powder valve is turned on and off, providing an accurate way of metering particulate material for filling a container or an open cavity.

Detailed Description with Reference to the Drawings

In the following description, the following definitions and explanations apply.

A closed die cavity refers to an embodiment set up such that there is no gap or open space between the apparatus for powder/particulate material filling and the die cavity receiving the powder/ particulate material.

A fillshoe is a device to which powder/particulate material is delivered in order that the die cavity or other mold may be filled.

In use, the fillshoe is held tight against the die surface (no gap is allowed) and the powder/particulate material is dropped into the die cavity.

To accomplish this action, the fillshoe moves in a translatory motion (back and forth) above the die cavity and therefore is size limited such that it fits between the die surface and the top punch of a die-casting machine during the fill operation.

Figure 1B:
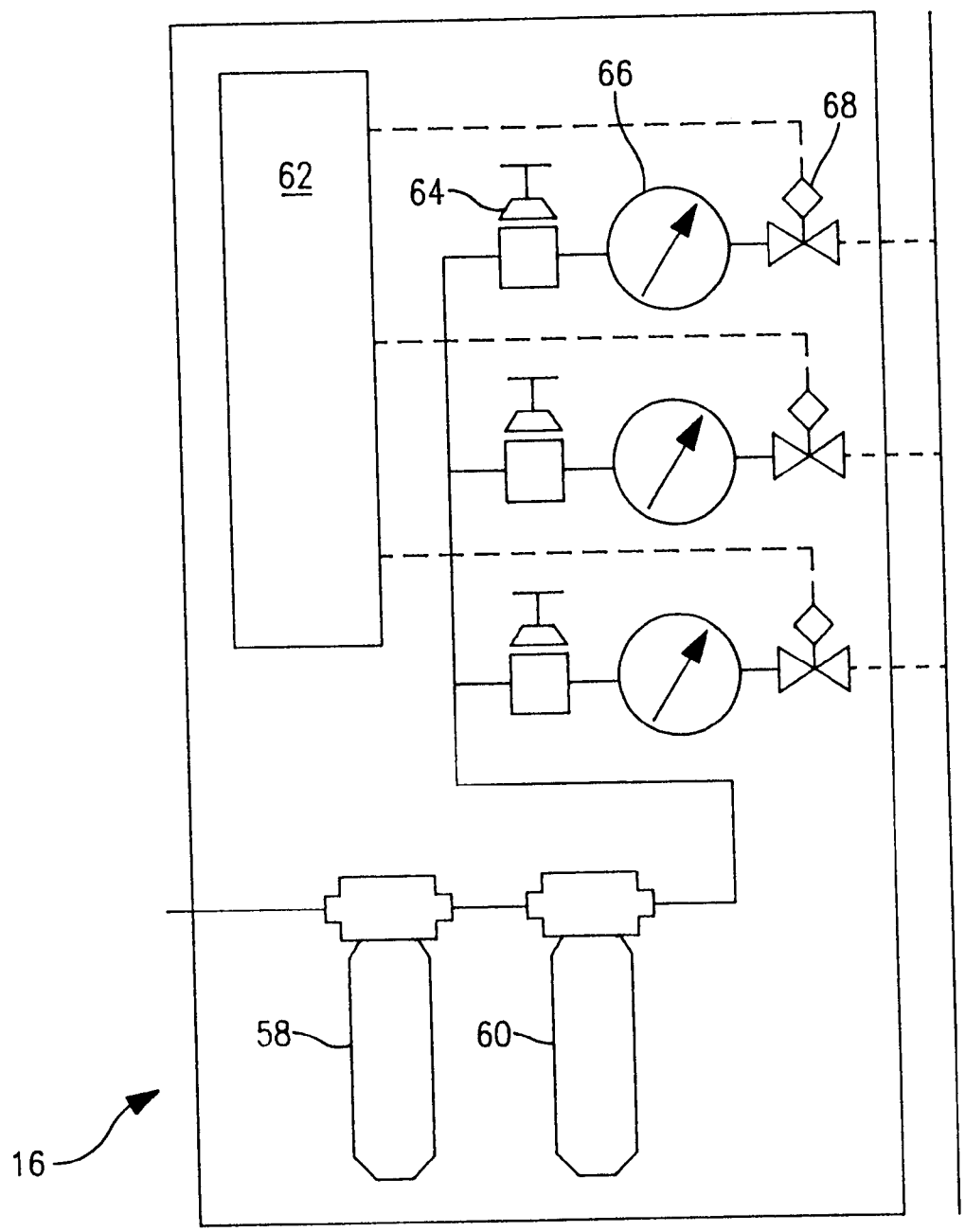
FIG. 1B is a schematic diagram of an exemplary apparatus for a gas control unit of an apparatus for filling closed die cavities.

With particular reference to FIGS. 1A and 1B, a powder delivery and filling system includes a mini-hopper 10, a transport device 12, a delivery chute 14 and a gas control unit 16. The mini-hopper 10 has a porous distributor plate 18 for partitioning the mini-hopper into a first partition 20 in which the bed of particulate material is stored and a second partition 22 separate from the first partition and in communication with the first partition via the porous distributor plate 18.

An inlet powder port 24 is provided for receiving powder mixture/particulate material in the first partition 20. The inlet powder port 24 is connected to the main hopper 26 with a flexible tube 28. The powder flows from the main hopper 26, through the flexible tube 28, through the inlet powder port 24 into a leveling pipe 130, and thence into the first partition 20 of the mini-hopper 10.

When the powder level in the mini-hopper 10 reaches the base of the leveling pipe 30 the powder forms a lock, powder flow stops and the powder level remains constant. The powder flow resumes to refill the mini-hopper 10 as soon as sufficient powder is discharged from the apparatus into the die cavity 32.

As such, no metering of the powder into the mini-hopper 10 is required and the powder level in the mini-hopper 10 fluctuates somewhat during the filling operation. It is preferred that the amount of powder stored in the mini-hopper 10 should be equivalent to at least 5 times the amount of powder required to fill the die cavity 32, thus assuring a constant flow.

An inlet gas port 34 is provided for receiving a compressed gas in the second partition 22. The porous distributor plate 18 ensures uniform transmission of gas pressure to all sections of the mini-hopper 10. The mesh size of the porous distributor plate 18 depends on the particle size distribution of the powder/particulate material, and is chosen to prevent clogging by entrapment of the small particles within the pores.

The mesh material is preferably stainless steel to provide high strength, good wear properties and good weldability, and non-corrosive behavior. Other materials may be used as well. The powder in the mini-hopper 10 is loosened by migration of the compressed gas through the porous distributor plate and into the first partition of the mini-hopper 10, and depending on the applied gas pressure the powder can become fluidized.

The bottom surface of powder in the mini-hopper 10 is loosened first and, as the pressure of applied gas rises becomes fluidized. As the amount of pressure is increased, all powder in the mini-hopper 10 can be fluidized. The amount of fluidization is controlled by regulating the gas pressure to the inlet gas port 34.

The proper regulation of the applied gas pressure and flow is important to the proper performance of the fill system. In the most preferred embodiment of this invention, only the bottom surface (or thin layer) of powder is loosened or fluidized. This layer will then provide a "gas bearing" which reduces friction and increases powder flow rate.

The gas pressure used depends on the powder characteristics and should be kept at a minimum. Metal powders typically used in the powder metallurgy industry have admixed lubricants and can be characterized as having good flow characteristics. For these powders the applied gas pressure used in the first partition of the mini-hopper 10 is less than 5 psi, typically around 2 psi.

For fine powders with poor flow characteristics, the magnitude of the applied gas pressure should be increased, typically up to 10 or 15 psi depending on powder characteristics, but care should be exercised to keep the applied gas pressure to a minimum necessary to accomplish the function of loosening the lowermost layer.

It should be noted that the pressures are applied pressures on the upstream side of the porous distributor plate 18. The actual gas pressure seen by the powder is less than the applied pressure because of a pressure drop across the porous distributor plate 18. The gas pressure is also adjusted to control the flow rate of powder out of the mini-hopper 10.

The use of low gas pressure ensures that only the bottom layer of the powder bed stored in the mini-hopper 10 is fluidized while the majority of the powder bed remains in a solid state. The use of low gas pressure will prevent powder segregation in the mini-hopper 10 when using a powder mixture or alloy with a wide powder size distribution, prevent any dusting of fine particles, and the powder can maintain a lock around the inlet leveling pipe 30.

The use of high gas pressure results in fluidization of the entire powder bed which will cause powder segregation, dusting of fine powders, and prevent a powder lock around the inlet leveling pipe 30 which will cause malfunctioning of the fillshoe. The powder flow rate into the transport 12 can also be controlled by the inclination of the porous distributor plate 18, shown horizontal in FIG. 1A.

Adding a slope to the porous distributor plate 18 will increase the powder flow rate out of the mini-hopper 10 and prevents any dead zones of powder in the back of the mini-hopper 10. The inclusion of a slope in the porous distributor plate is most helpful for powders/particulate materials with poor flow characteristics. The inclination should be kept small (e.g. between 0 and 20 degrees of inclination, preferably between 5–10 degrees, most preferably about 7.5 degrees) because a large inclination will cause uneven loosening and fluidization of the layer of powder near the porous distributor plate 18.

The mini-hopper 10 is covered with a venting screen 36, which allows the gas to escape to prevent build up of pressure within the mini-hopper 10 while entraining any particles. The mesh size of the venting screen 36 depends on the particle size distribution of the powder/particulate material being used.

The height of powder in the mini-hopper 10, reference letter "H" in FIG. 1A, influences the flow rate of powder into the transport 12. At a constant gas pressure, the higher the level of H, the higher the powder flow rate.

The mini-hopper 10 provides a break between the fillshoe and the main hopper 26. As such, it provides higher efficiency and accuracy of filling by isolating the filling operation from the main powder supply in the main hopper 26, from variations in head pressure in the flexible tube 28 and main hopper 26, and from powder surge in the flexible tube 28. The result is to maintain the same conditions for successive fill operations, which contributes to consistency of fill of die cavity.

The transport device 12 receives powder from the mini-hopper 10 and is connected to the side of the mini-hopper 10 via side discharge 38. The side discharge 38, as opposed to a discharge from the base, helps to keep the profile of the apparatus to a minimum to meet the clearance requirements for installation and operation on a die-casting machine.

The transport device 12 has a porous distributor plate 40 for partitioning the transport device 12 into a first partition 42 in which the particulate material flows and a second partition 44 separate from the first partition and in communication with the first partition via the porous distributor plate 40. The powder flows from the mini-hopper 10 into the first partition of the transport device 12. The powder flow stops when the transport 12 is full.

The powder flow resumes as soon as powder is discharged from the delivery chute 14 into the closed die cavity 32. An inlet gas port 46 is provided for receiving a compressed gas in the second partition. The porous distributor plate 40 ensures uniform transmission of gas pressure to all sections of the transport 12.

The powder is loosened and can become fluidized by migration of the compressed gas through the porous distributor plate and into the first partition. The mesh size of the porous distributor plate 40 again depends on the particle size distribution of the powder/particulate material, and is chosen to prevent clogging by entrapment of the small particles within the pores.

The degree of fluidization is controlled by regulating the gas pressure to the inlet port 46. The pressure and volumetric flow of the gas is critical to the proper performance of the fill system. The gas pressure used in the transport 12 is the same or similar, to the pressure used for the mini-hopper 10, and the pressure and volumetric flow are kept at a minimum.

Again, the use of low gas pressure ensures that only the bottom layer of the powder in the transport device 12 reaches a fluidized state while the majority of the powder remains solid. This will prevent powder segregation in the transport device 12 when using a powder mixture or alloy with a wide powder size distribution, and prevent any dusting of fine particles.

The transport device 12 is covered with a venting screen 48, which allows the gas to escape to prevent build up of pressure within the transport 12 while entraining any particles. The mesh size of the venting screen 48 depends on the particle size distribution of the powder/particulate material being used. The venting screen extends over the entire length of the transport 12 to minimize the time required for gas to escape and minimize any disturbance of the powder flow.

The transport device 12 sits preferably at an angle of about 45 degrees to the horizontal. Other configurations are possible, including from 0–15 degrees, 15–30 degrees, 30–45 degrees, and 45–60 degrees. Inclinations beyond 60 degrees are possible, but will require a large clearance between the die surface and upper punch.

This angle controls the powder trajectory as it enters the delivery chute 14. This angle can be adjusted to make sure it meets the clearance requirements of the die-casting machine on which the system will be mounted. As such, it can in some embodiments vary from zero, i.e., horizontal, to around 50 degrees. The angle of the transport device 12 to the horizontal influences the flow rate from the transport device 12 through the delivery chute 14 and into the die cavity 32.

For the same head pressure, a high angle for the transport device 12 will increase the flow rate while a low angle will reduce the flow rate. The angle of the transport device 12 is tailored to powder type. Typically, powders with poor flow characteristics or high angle of friction require a higher angle for the transport device 12.

The gas pressure at inlet port 46 is also used to control the flow rate. An increase in gas pressure will result in an increase in powder flow rates and vice versa. The applied gas pressure is adjusted depending on, inter alia, the cross-sectional area of the transport device 12, the cross-sectional area of the die cavity opening, the volume of the die cavity 32, and the time allowed for fill during the compacting operation. In addition, the width of the transport device 12 is tailored such that the width increases slightly from the mini-hopper 10 to the delivery chute 14. The increase in width results in a diverging channel for powder flow. The result is much improved and consistent powder flow, especially for powders with poor flow characteristics The delivery chute 14 functions as the powder discharge unit directly above the die cavity 32. The delivery chute 14 has an outer ring 50, which surrounds the opening of the die cavity 20. The delivery chute 14 is covered with a venting screen 52, which allows the gas to escape to prevent build up of pressure within the delivery chute 14 while entraining any particles.

As noted above, the mesh size of the venting screen 52 depends on the particle size distribution of the powder/particulate material being used. The venting screen 52 should be proximate to the die cavity 32 to allow the gas to escape in the least amount of time to prevent any turbulence caused by buildup of gas pressure and delay in die filling operation. The size of the venting screen 52 is also maximized to minimize the time required for the gas to escape. The lack of proper venting will cause variations in filling and partial filling, especially for powders with poor flow characteristics.

Fluidizers are preferably embedded in the delivery chute 14 to ensure powder is fluidized just before filling the die cavity 32. The design of the fluidizers is customized to part shape to optimize, fill performance for individual parts or family of parts, depending on part size and shape complexity.

Figure 2A:
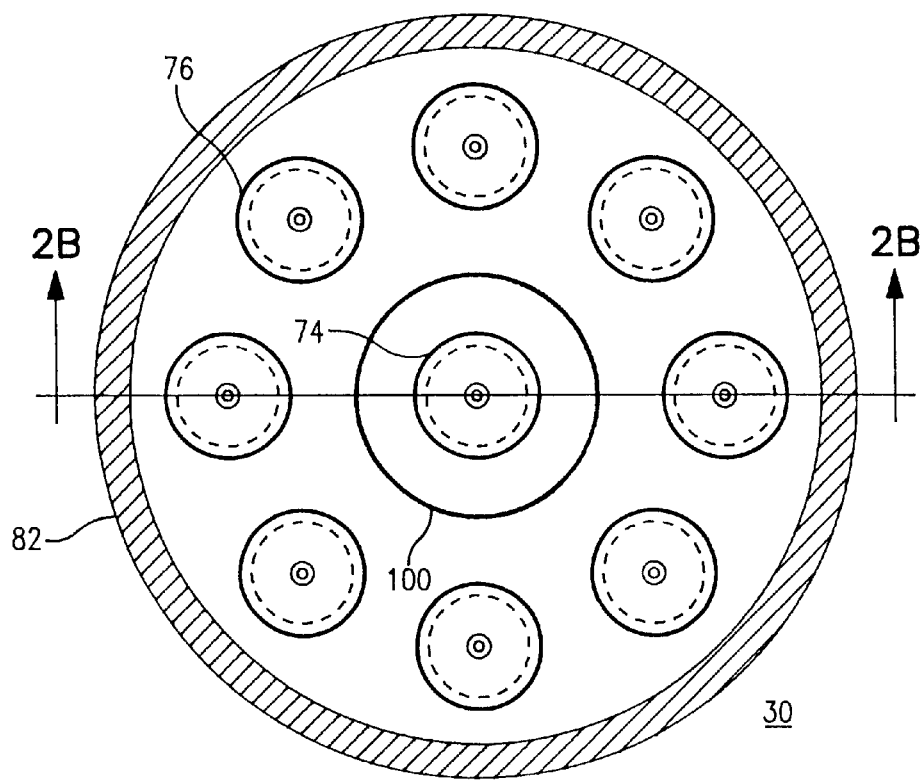
FIG. 2A is a top plan view of an exemplary delivery chute design with multiple fluidizers or pedals.

Turning now to FIG. 2A, several small exemplary fluidizers are illustrated. Those as in FIG. 2A are used for gear-shaped parts, and are positioned, e.g., above gear lightening holes.

Figure 3:
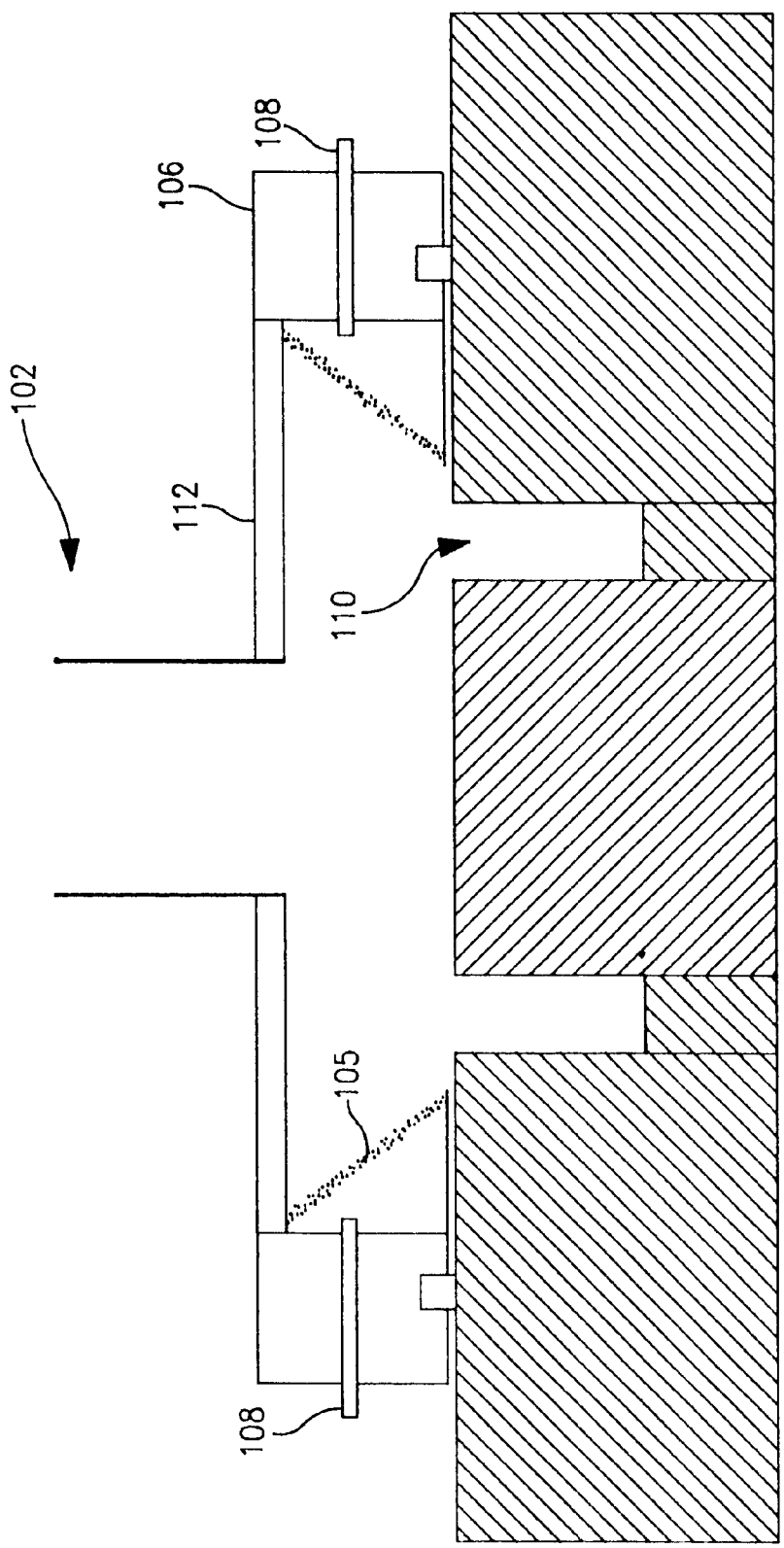
FIG. 3 is a cross-sectional view of another exemplary delivery chute design with a ring fluidizer.

A ring fluidizer as illustrated in FIG. 3 may be used for powders with poor flow characteristics to improve fill consistency.

Figure 4A:
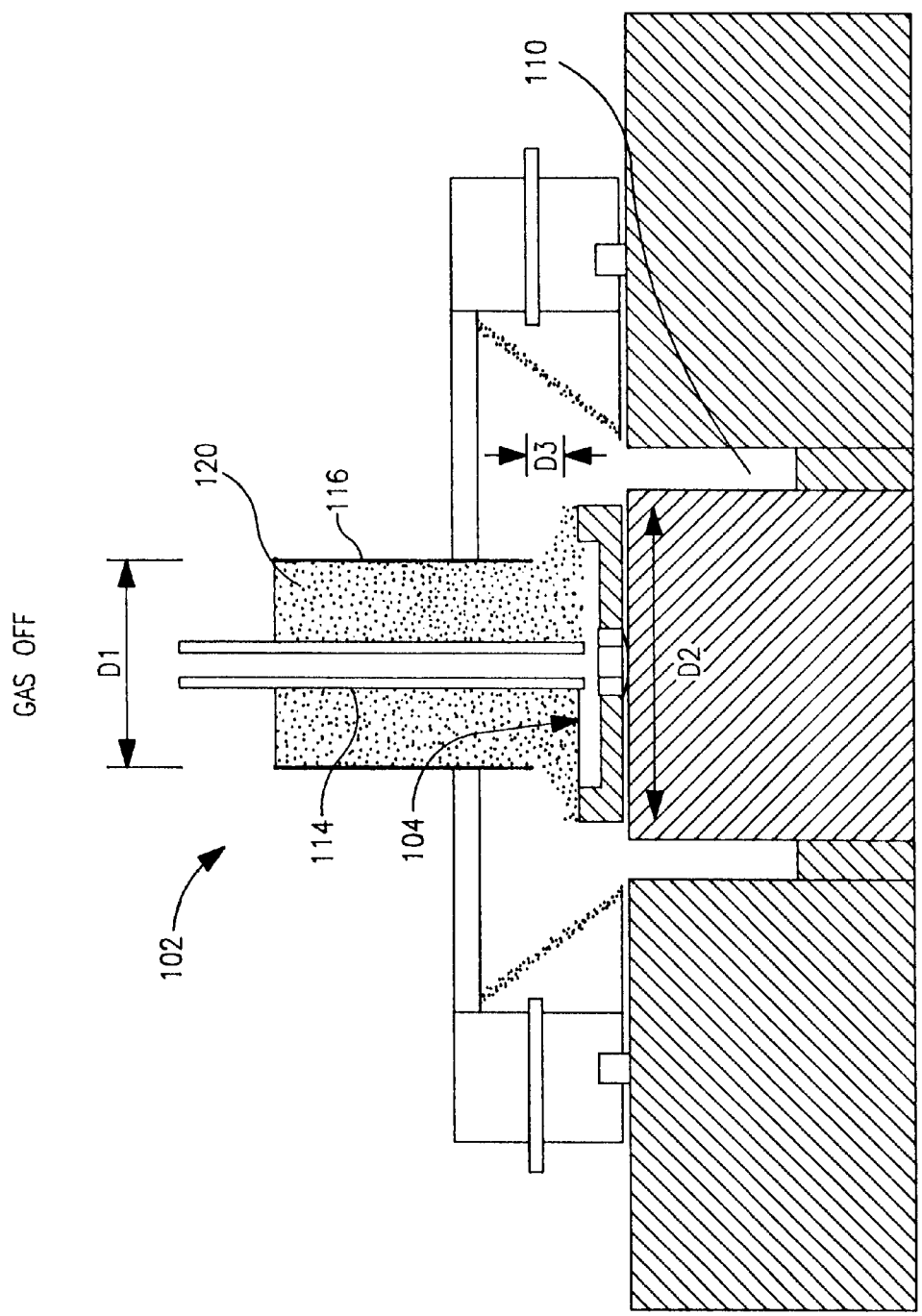
FIG. 4A is a cross-sectional view of another preferred embodiment of a delivery chute design with a ring fluidizer and a center fluidizer illustrating a gas off condition whereby the chute functions as a passive valve (powder locks when gas is off.
Figure 4B:
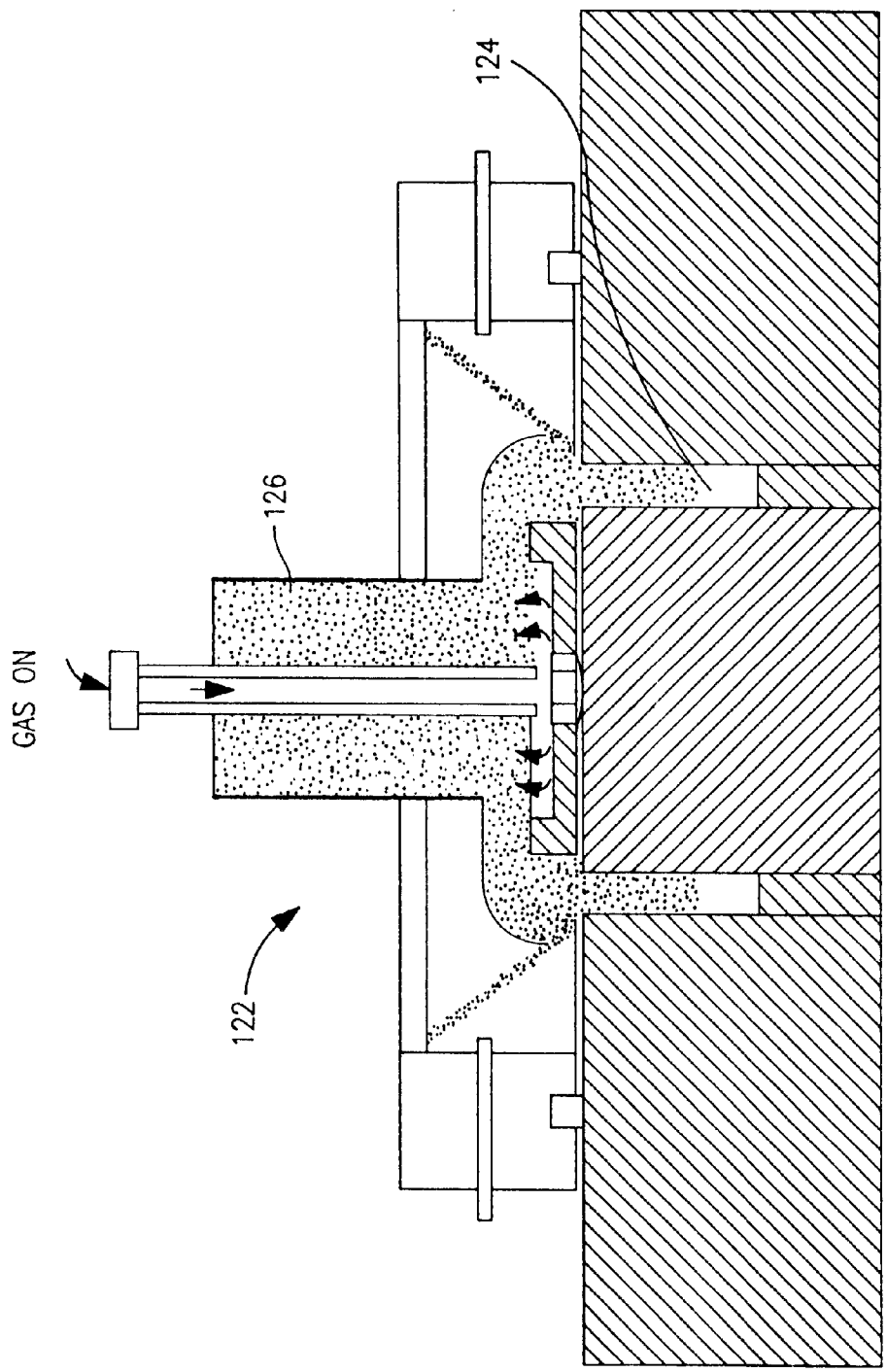
FIG. 4B is a cross-sectional view of the embodiment of FIG. 4A illustrating the gas on condition whereby the delivery chute functions as a passive valve (powder flows when gas is on).

One center fluidizer is illustrated in FIGS. 4a and 4b, and can be used, e.g., for large ring-shaped parts. A unique feature of this center fluidizer is that it acts like a powder valve when the gas is turned on and off. FIG. 4A illustrates the "gas off" situation where the powder is not flowing, and the backup on the central fluidizer keeps the powder locked. FIG. 4B illustrates the "gas on" situation where the powder is flowing by the fluidization action of the gas.

In addition, a ring fluidizer may be combined with either a center fluidizer or several small fluidizers to increase fill speed and further improve fill uniformity.

Referring again to FIG. 1, an inlet port 54 is provided for receiving a compressed gas in the center fluidizer. The delivery chute 14 is attached to the transport device 12 by a joint plane 56. The method of attachment allows the easy removal of the delivery chute 14 and its quick replacement and customization for a different die cavity 32.

Turning to FIG. 1B, it may be seen that the gas control unit 16 may be located in a separate housing and is used to control the gas moisture content and regulate powder fluidization timing in relation to the movement of the fill shoe on the die-casting machine.

An in-line dryer 58 may be used to remove moisture from the gas supply. An in-line filter 60 may be used to remove solid impurities in the gas supply. The gas control 16 contains a control device 62, which may be a computing device capable of being programmed for various run profiles and sensing parameters to control the fluidized particulate flow. The control device may also incorporate a timer, three independent pressure regulators 64, three pressure gauges 66, and three pneumatic solenoids 68. The gas control unit 16 is used to regulate the flow of gas to each segment of the fillshoe independently.

The timing of the gas flow to the center fluidizer is used to control the amount of powder discharged into the die cavity 32. The timing may be triggered by a micro-controller on the die casting machine or by a proximity sensor mounted on the die casting machine. The die casting or other machine may also be connected to the control device 62 to provide seamlessly integrated operation.

The use of 3 independent stages for pressure and timing allows customization and tuning of each stage of the system for multiple applications.

Returning to FIG. 1, it may be seen that the apparatus also provides an exhaust hood 70 for collection of any fine powder particles that may escape through the venting screens. The exhaust hood 70 has a vent 72 which is left open or can be connected to a vacuum machine if the escape of any amount of particles is considered detrimental to the environment.

The venting screens are designed as removable vents for easy maintenance and cleaning of the apparatus. A hold-down mechanism is attached to the fillshoe to hold the fillshoe tight on the die casting machine and move the fillshoe forward into fill position and pull it back from under the punch during compacting. The hold-down mechanism may be attached to the fillshoe at shoulder bolts 74.

FIG. 2A shows the design for a delivery chute for producing, e.g. a gear, by the process according to the invention with one (1) lightening hole at the center and eight (8) lightening holes around the circumference. The delivery chute shows the layout, which includes a center fluidizer 74 and eight fluidizers 76 around the circumference. An outer ring 82 around the fluidizers inside the delivery chute 14 has an inside diameter larger than the outside diameter of the die cavity 32 and surrounds the die cavity 32 when the fillshoe is in the fill position.

As the fillshoe is pushed forward into fill position above the die cavity, the fluidizers will be right above core rods inside the die cavity.

Figure 2B:
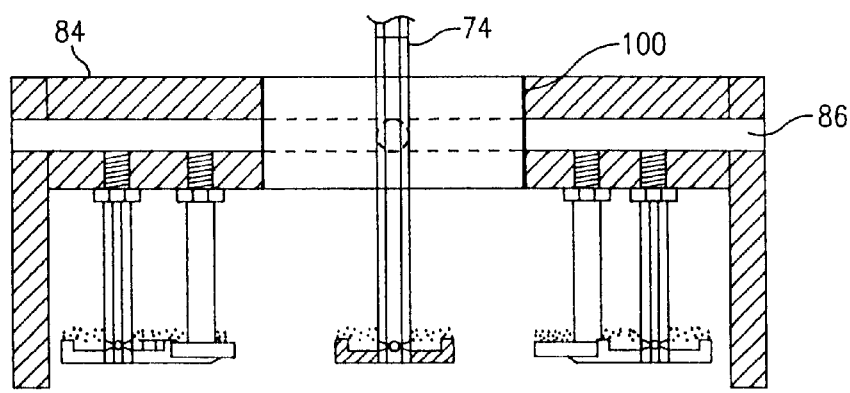
FIG. 2B is a cross-sectional view of an exemplary chute design with multiple fluidizers or pedals.

FIG. 2B illustrates a vertical cross section and shows how the center fluidizer 74 and the fluidizers 76 around the circumference are suspended from a manifold 84 inside the delivery chute 14. A gas port 86 is provided to allow gas to flow into the individual fluidizers.

Figure 2C:
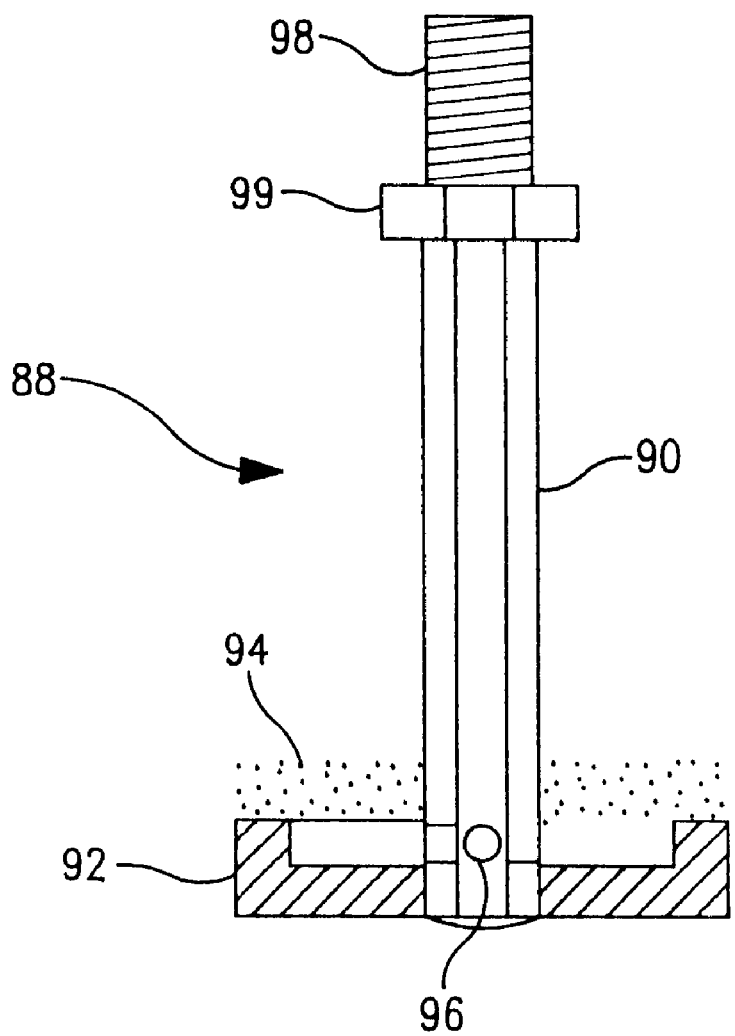
FIG. 2C is a cross-sectional view of an individual fluidizer.

Turning now to FIG. 2C, it can be seen that each individual fluidizer 88 has a tube 90, which acts as a support and allows gas to flow through. The tube 90 is connected at the base to a cup 92. The cup 92 is covered with a porous distributor plate 94, which ensures uniform transmission of gas to the powder inside the delivery chute 14. The tube 90 has holes 96 between the cup 92 and the porous distributor plate 94. The holes 96 are evenly distributed around the circumference of the tube 90 to ensure uniform gas pressure inside the chamber between the cup 92 and porous distributor plate 94. The tube 90 has threads 98 at the top. The threads 98 are used to suspend the fluidizer 88 from the manifold 84 (FIG. 2B). A lock nut 99 at the base of the threads 98 is used to secure a tight fit of the fluidizer 88 to the manifold 84.

The center fluidizer 74 (FIG. 2A) and the fluidizers 76 around the circumference have the same design as discussed for an individual fluidizer 88 (FIG. 2C). The diameter of the center fluidizer 74 can be different than the diameter of the other fluidizers 76, depending on the part shape.

A collimator 100 (FIG. 2A) is centered within the delivery chute 14 (FIG. 1A) and on the center fluidizer 74 (FIG. 2A). The optimal case for powder filling is to drop the powder vertically and uniformly above the die cavity 32. The powder exits the transport device 12 at an angle alpha and enters the delivery chute 14 through the collimator 100.

The collimator 100 changes the direction of the powder to vertical. By adjusting the height of the collimator 100 a nearly uniform distribution of powder is achieved. Without the collimator 100 the powder exits the transport at an angle and hits the front of the delivery chute before dropping into the die cavity 32. As a result, without the collimator 100 variations in fill are seen between the front and back of the die cavity 32.

Typical operation of the fluidized fillshoe includes several stages. The fluidized fillshoe shown in FIG. 1A is mounted on a die casting machine. The fillshoe is pushed forward until the delivery chute 14 is centered above the die cavity 32. As the fillshoe is pushed forward, the powder is fluidized by turning the gas pressure on.

The powder is dropped in the die cavity 32 and the fillshoe is then retracted. The fillshoe may dwell on top of the die cavity 32 for around one second, depending on the size of the die cavity. Other fill times are possible, but the preferred ranges are from 0.10 to 0.5 seconds, 0.5 seconds to 1.0 seconds, and 1.0 to 3.0 seconds.

Powder overfills the die cavity 32 and as the fillshoe is retracted the front of the delivery chute 14 scrapes the top of the die cavity and levels the powders. Typically, the gas pressure is turned off after the dwell time and during retraction of the fillshoe. However the gas may merely be run at a reduced pressure so as to substantially lessen or completely reduce the powder flow without completely closing the valves.

Once the gas pressure is off, all powder within the fillshoe returns to a state resembling a solid. During the next fill operation, the powder will have to be fluidized again before filling. The system in a preferred embodiment delivers an amount of powder for each fill operation enough to fill, or slightly overfill, the die cavity 32 and then is turned off, as opposed to a continuous fill operation. However, in some circumstances a continuous fill may be desirable, e.g. in extremely high speed operations.

FIG. 3 shows a delivery chute 102 with a ring fluidizer configuration. A porous distributor plate 105 lies within the outer ring 106 on the delivery chute 102. An inlet gas port 108 is provided for receiving a compressed gas between the porous distributor plate 105 and the outer ring 106.

A plurality of gas ports are present spaced radially around the ring in a preferred embodiment. The porous distributor plate 105 ensures uniform transmission of gas pressure to all sections of the delivery chute 102.

A powder ring around the porous distributor plate 105 inside the delivery chute 102 becomes fluidized by migration of the gas through the porous distributor plate 105 and into the delivery chute 102. The powder is fluidized just before it drops inside the die cavity 110. Venting screens 112 are provided to allow the gas to escape and prevent buildup of pressure inside the delivery chute 102. The inclination of the porous distributor plate 105 to the horizontal varies from zero (horizontal) to 90 degrees (vertical) depending on the powder flow characteristics and part shape, including size and complexity. Preferred ranges are from 10–45 degrees, 45–90 degrees, and especially about 45 degrees., FIG. 4A illustrates a delivery chute 102 with both a fluidized valve and ring fluidizer. The fluidized valve is used to meter the powder flow into the die cavity 110 by turning the gas flow on and off. The fluidized valve consists of an individual fluidizer 114 combined with an extended collimator 116. The collimator 116 extends inside the delivery chute leaving a gap D3 between the base of the collimator tube 116 and the top of the porous distributor plate 104. When the gas is off, the powder 120 in the collimator 116 and above the porous distributor plate 104 forms a lock preventing any powder flow out of the delivery chute.

The functioning of the fluidized valve depends on proper formation of a powder lock as soon as the gas is shut off. The powder lock illustrated in FIG. 4A depends on powder characteristics, especially the powder angle of repose, the diameter D1 of the collimator tube 116, the diameter D2 of the porous distributor plate 104 and the gap D3. An angle beta is defined such that the tangent of beta is equal to D3 divided by (D2–D1)/2 (See graphical representation 1 below). If the angle beta is greater than the angle of repose of the powder, than no powder lock will form. D2 is typically controlled by the inside diameter of the part to be compacted. D1 is fixed for a given delivery chute. D3 can be adjusted to enable a powder lock.

GRAPH 1

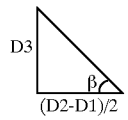

Typically, the angle beta is reduced to less than, or equal to the angle of repose of the powder. At the same time, the gap controls the powder flow rate out of the delivery chute. If the gap D3 is reduced significantly, the performance of the fillshoe will be adversely affected. The gap D3 should be as large as possible to increase powder flow rate when the gas is turned on while maintaining a powder lock when the gas is shut off. When the gas is turned on, the powder flows as illustrated in FIG. 4B.

Typical operation of the fluidized fillshoe with a single valve has one major difference from the design with multiple fluidizers. While the gas is turned off, the fillshoe is pushed forward until the delivery chute 122 is centered above the die cavity 124. No powder is dropped in the die cavity as the fillshoe is pushed forward. Once the delivery chute 122 is centered above the die cavity 124, the gas is turned on and the die cavity 124 is filled. As such, all powder is dropped vertically, consistently and uniformly into the die cavity during successive filling operations.

The dwell time of the fillshoe over the die cavity 124 depends on the size of the die cavity 124. The gas is shut off, a powder lock is formed inside the collimator tube 126, and then the fillshoe is retracted. The dwell time is controlled with the timer to minimize the amount of overfill of the die cavity 124. As the fillshoe is retracted, the die cavity surface is scraped and the excess loose powder within the delivery chute 122 is discharged into a cavity or sloped area in a wear plate on top of the die casting machine. As such, during the subsequent fill operation no residual powder exists within the delivery chute and no powder is dropped in the die cavity 124 during fillshoe movement.

Turning now to FIGS. 5A and 5B a preferred apparatus for open cavity will be described in detail.

"Open cavity" refers to a set up in which there is a gap or open space between the apparatus for powder/particulate material filling and the cavity or container receiving the powder/particulate material.

Typically, powder/particulate material is delivered to a filling station above the container and dropped freely into an open container. Air in the container is allowed to escape freely. In this application, the fill system is stationary. When located on a production line, there is generally no limit on space above the open cavity.

With reference to FIG. 5A particularly, a powder delivery and filling system for an open cavity includes a mini-hopper 128, a transport 130, a delivery chute 132 and a gas control unit (not shown, but similar to FIG. 1B). The mini-hopper 128 has a porous distributor plate 134 for partitioning the mini-hopper into a first partition 136 in which the bed of particulate material is received and a second partition 138 separate from the first partition and in communication with the first partition via the porous distributor plate 134.

An inlet powder port 140 is provided for receiving powder mixture/particulate material in the first partition. The inlet powder port 140 is connected to the main hopper with a leveling pipe 142. The powder flows through the inlet powder port 140 into the leveling pipe 142 into the first partition 136 of the mini-hopper. When the powder level in the mini-hopper 136 reaches the base of the leveling pipe 142 the powder forms a lock, powder flow stops and the powder level is maintained constant.

The powder flow resumes as soon as powder is discharged from the mini-hopper 128 into the transport 130. An inlet gas port 144 is provided for receiving a compressed gas in the second partition of the mini hopper 128. The porous distributor plate 134. ensures uniform transmission of gas pressure to all sections of the mini hopper 128. As elsewhere, the porous distributor plate may be either vertical or at an angle to the vertical, depending on powder flow characteristics.

As noted above, the layer of powder near the porous distributor plate 134 becomes loose by migration of the compressed gas through the porous distributor plate and into the first partition. The mesh size of the porous distributor plate 134 depends on the particle size distribution of the powder/particulate material, and is chosen to prevent clogging by entrapment of the small particles within the pores.

The mesh material is preferably stainless steel to provide high strength, good wear properties, good weldability and non-corrosiveness. Other materials may be selected for varying purposes, e.g. filtering or the like, and other materials may be used such as aluminum, copper, reinforced felting, etc.

The fluidization is controlled by regulating the gas pressure to the inlet port 144. The volume of the gas flow and the. gas pressure is important to the proper performance of the fill system. The gas pressure used depends on the powder characteristics and preferably should be kept at a minimum. The use of low gas pressure ensures that only the layer of the powder near the porous distributor plate 134 is fluidized while the majority of the powder remains in a solid state.

This will prevent powder segregation in the mini-hopper 128 when using a powder mixture with a wide powder size distribution, prevent any dusting of fine particles, and the powder can maintain a, lock around the inlet leveling pipe 142.

Turning now to FIG. 5B, it can be seen that the mini-hopper 128 is covered with a venting screen 148 which allows the gas to escape to prevent build up of pressure within the mini-hopper while entraining any particles. The mesh size of the venting screen 148 depends on the particle size distribution of the powder/particulate material being used.

The mini-hopper 128 provides a break between the fillshoe and the main hopper. As such, it advantageously isolates the filling operation from the variations in head pressure, and provides a constant powder head. The result is to maintain uniform conditions for successive fill operations, which contributes to consistency of fill.

The transport device 130 has a porous distributor plate 152 for partitioning the transport into a first partition 154 in which the particulate material is received and a second partition 156 separate from the first partition and in communication with the first partition via the porous distributor plate 152. An inlet gas port 158 is provided for receiving a compressed gas in the second partition.

The porous distributor plate 152 ensures uniform transmission of gas pressure to the first partition of the fluidized pipe transport device 154. The layer of powder near the porous distributor plate 152 becomes loose by migration of the compressed gas through the porous distributor plate and into the first partition. Again, the mesh size of the porous distributor plate 152 depends on the particle size distribution of the powder/particulate material, and is chosen to prevent clogging by entrapment of the small particles within the pores.

The mesh material is preferably stainless steel to provide high strength, good wear properties, good weldability and is non-corrosive, but other materials may be used.

The fluidization is controlled by regulating the gas pressure to the inlet port 158. The magnitude of the gas pressure is important to the proper performance of the fill system. The gas pressure used depends on the powder characteristics and should be kept at a minimum. The use of low gas pressure ensures that only a thin layer of the powder near the porous distributor plate 152 is loosened to eliminate or minimize dusting and segregation.

The transport 130 is covered with a venting screen 160 which allows the gas to escape to prevent build up of pressure while entraining any particles. The mesh size of the venting screen 160 depends on the particle size distribution of the powder/particulate material being used. The inclination of the porous distributor plate 152 to the horizontal varies depending on powder flow characteristics. A typical inclination is around 45 degrees, but ranges from 5–25; 25–65; and 65–75 are possible depending on the powder type.

The delivery chute 132 functions as the powder discharge unit directly above the open cavity 164. The delivery chute 132 has a collimator pipe 166 and a fluidizer 169. The collimator pipe 166 redirects the direction of flow of the powder to vertical and is directly positioned above the open cavity.

The fluidizer 169 has the same design as the fluidizer illustrated in FIGS. 4A and 4B. The combination of the collimator pipe 166 and fluidizer porous distributor plate 168 enable the system to function as a fluidized valve with powder flow when the gas is turned on and no powder flow when the gas is turned off.

The delivery chute 132 is covered with a venting screen 170 which allows the gas to escape to prevent build up of pressure within the delivery chute 132 while entraining any particles. The mesh size of the venting screen 170 depends on the particle size distribution of the powder/particulate material being used. The proximity of the venting screen 170 to the top of the porous distributor plate 168 is critical to allow the gas to escape in the least amount of time to prevent any turbulence caused by buildup of gas pressure and interference with powder flow within the collimator tube 166.

An inlet gas port 172 is provided for receiving a compressed gas in the fluidizer.

The gas control unit 16 as illustrated in FIG. 1B is located in a separate housing and is used to control the gas moisture content and regulate powder fluidization timing in relation to time of filling of the open container. The gas control unit 16 is used to regulate the flow of gas to each segment of the fillshoe system independently. The timing of the gas flow to the center fluidizer is used to meter the amount of powder discharged into the cavity 164.

The gap D3 between the base of the collimator tube 166 and the top of the porous distributor plate 168 is adjusted to control the flow rate. When the gas is off, the powder in the collimator 166 and the porous distributor plate 168 forms a lock preventing any powder flow out of the delivery chute 132.

The functioning of the fillshoe system depends on proper formation of a powder lock as soon as the gas is shut off. The powder lock illustrated in FIG. 5A depends on powder characteristics, especially the powder angle of repose, the diameter D1 of the collimator tube 166, the diameter D2 of the porous distributor plate 168 and the gap D3. An angle beta is defined such that the tangent of beta is equal to D3 divided by (D2−D1)/2. If the angle beta is large than no powder lock will form. D2 is typically controlled by the inside diameter of the part to be compacted. D1 is fixed for a given delivery chute. D3 can be adjusted to enable a powder lock.

Typically, the angle beta is reduced to less than or equal to the angle of repose of the powder. A preferred angle is 45 degrees, and other usable ranges include 25–65 degrees and from 10–80 degrees, approaching the vertical or horizontal. At the same time, the gap controls the powder flow rate out of the delivery chute. If the gap is reduced significantly, the performance of the fill system will be adversely affected. The gap D3 should be as large as possible while maintaining a powder lock.

When the gas is turned on, the powder flows as illustrated in FIG. 5B. A built in micrometer 174 is used to adjust the gap D3. The micrometer 174 is near the gap D3 which makes it easy to use, and is on the outside the delivery chute 132 which makes it easy to access.

Figure 6:
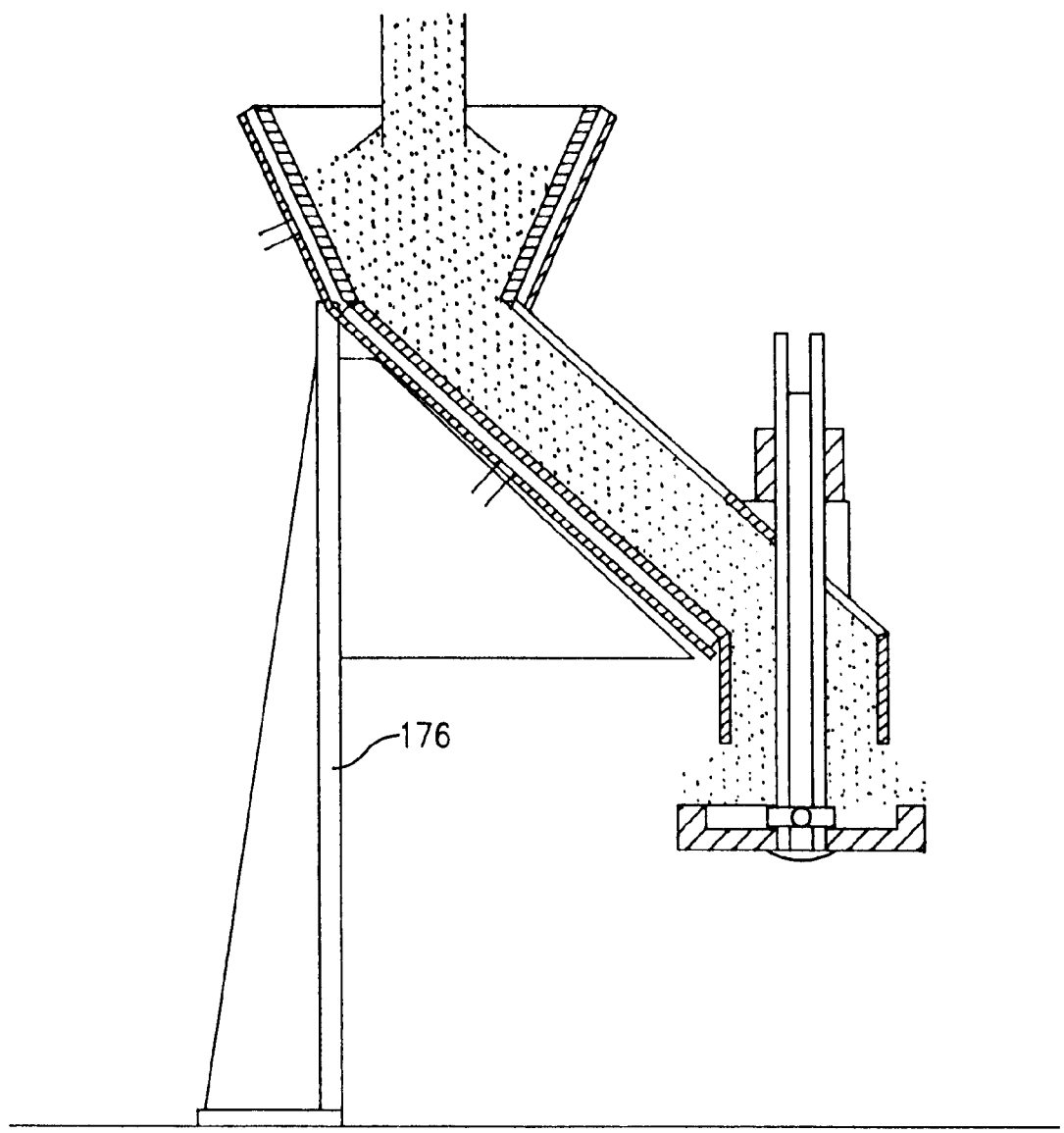
FIG. 6 is a cross-sectional view of an embodiment of the invention configured for filling open cavities with powders with good flow characteristics.

FIG. 6 illustrates one method for supporting the apparatus for filling open cavities. The apparatus may be affixed to post 176

Figure 7:
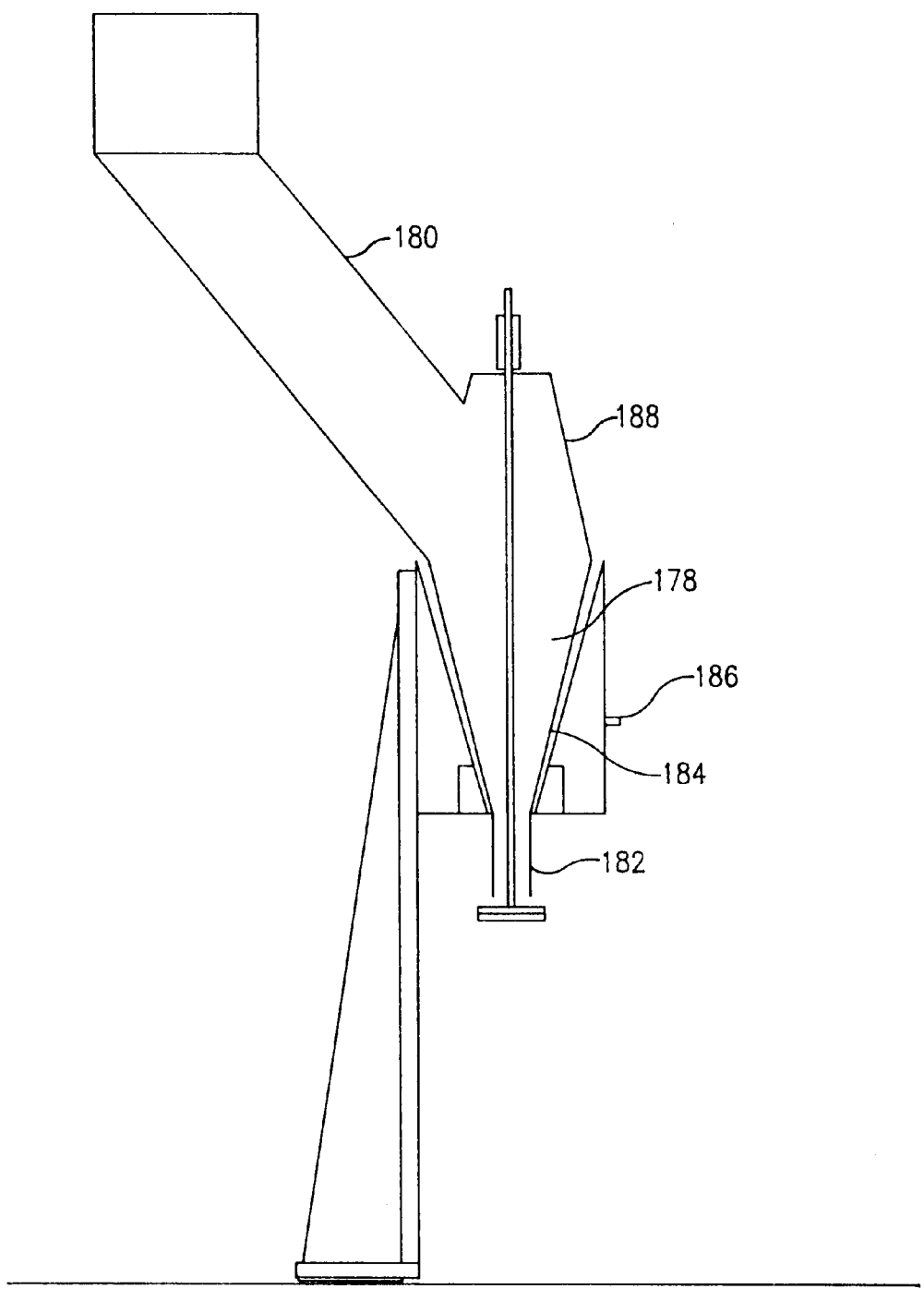
FIG. 7 is a cross-sectional view of an embodiment according to the invention for filling open cavities with powders with poor flow characteristics.

FIG. 7 illustrates an embodiment suitable for powder/particulate material with very poor flow characteristics. A fluidized cone 178 is introduced between the transport 180 and the delivery chute 182. The fluidized cone 178 has a porous distributor plate 184 for partitioning the fluidized cone 178 into a first partition in which the particulate material is received and a second partition separate from the first partition and in communication with the first partition via the porous distributor plate 184.

An inlet gas port 186 is provided for receiving a compressed gas in the second partition. The layer of powder near the porous distributor plate 184 becomes loose by migration of the compressed gas through the porous distributor plate and into the first partition. The fluidization is controlled by regulating the gas pressure to the inlet gas port 186. The magnitude of the gas flow and the gas pressure is important to the proper performance of the fill system.

The gas pressure used depends on the powder characteristics and should be kept at a minimum. The use of low gas pressure ensures that only a thin layer of the powder near the porous distributor plate 184 is loosened to eliminate or minimize dusting and segregation. The cone fluidizer 178 is covered with a venting screen 188 which allows the gas to escape to prevent build up of pressure while entraining any particles.

The inclination of the porous distributor plate 184 to the horizontal varies depending on powder flow characteristics. A typical inclination is around 45 degrees.

Figure 8:
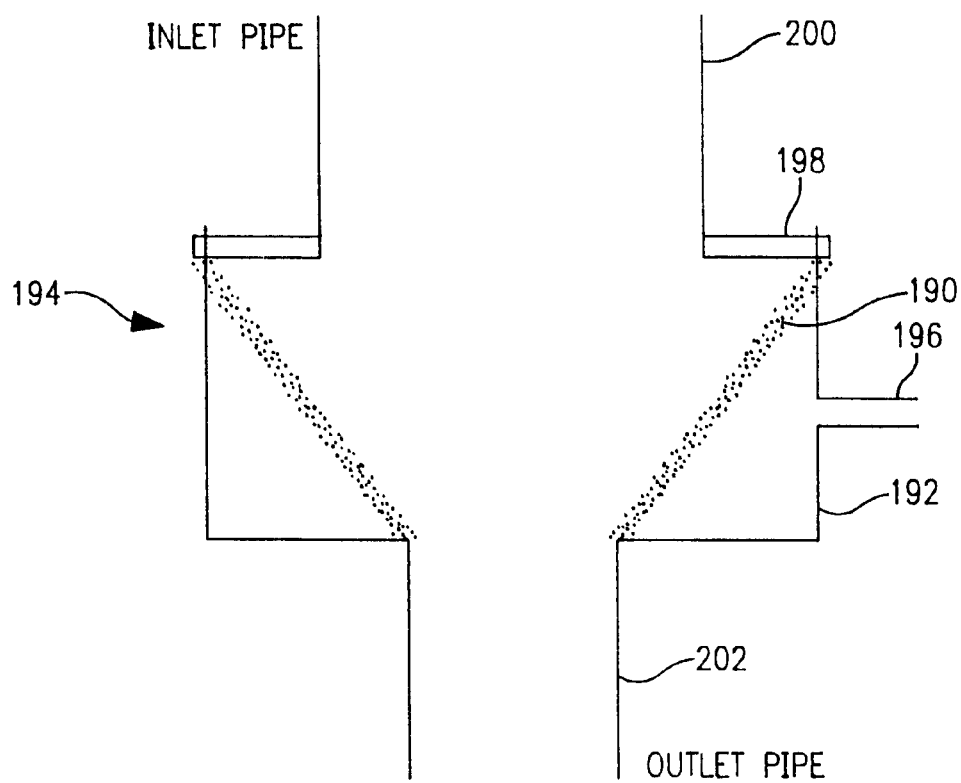
FIG. 8 is a cross sectional view of a fluidized in-line connector according to the present invention to assist the flow of powders with poor flow characteristics.

Turning now to FIG. 8, an embodiment suitable for powder/particulate material with poor flow characteristics is described. With such characteristics, replenishment of the mini-hopper from the main hopper through a flexible hose may be inconsistent. An in-line fluidized connector is introduced at discrete locations along the flexible tube, especially at the location where there is a reduction in the diameter of the tube.

The purpose of the fluidized connector is to assist powder flow in pipes and tubes, especially at areas with a transition in pipe diameter. With reference to FIG. 8, a porous distributor plate 190 surrounds the outer ring 192 of the fluidized connector 194. An inlet gas port 196 is provided for receiving a compressed gas between the porous distributor plate 190 and the outer ring 192. A powder ring around the porous distributor plate 190 inside the fluidized connector 194 becomes fluidized by migration of the gas through the porous distributor plate 190 and into the fluidized connector 194.

Venting screens 198 are provided to allow the gas to escape and prevent buildup of pressure inside the fluidized connector or exit through the inlet pipe 200 or the outlet pipe 202. The inclination of the porous distributor plate 190 to the horizontal is 45 degrees, but is adjusted depending on the powder flow characteristics.

The control of gas pressures, volumes, and flow to the various gas inlet ports of the present invention is controllable by variable valves as illustrated in FIG. 1B. The valves may be controlled by a computer running appropriate software to accomplish the result of smooth flow. The valves may also be manually adjusted by an experienced operator for smooth flow. Suitable computer equipment includes standalone or networked computers for control of stages of a continuous process. Strategically located sensors may detect excess powder flow, and optical inspection may reveal insufficiently filled dies or molds. In that event, the sensors, which can be linked to the control computer, signal that too much or too little powder is being transferred though the apparatus, and the gas flow may be increased or decreased as the situation warrants.

While the invention has been particularly shown and described with reference to a preferred embodiment thereof, it will be understood by those skilled in the art that various changes in form and details may be made therein without departing from the spirit land scope of the invention.

Having described the invention as above, we claim:

1. A fluidizer apparatus for gravity feeding particulate material without causing the particulate material to cause dust or separate into sizes, said fluidizer comprising:

a hollow tube having a first end and a second end;

a porous distributor plate having a first side and a second side and attached to said second end of said hollow tube for receiving said particulate material on said first side thereof;

a vent; and, a source of gas attached to said first end of said hollow tube, said gas having a pressure such that a gas bearing is formed between said first side of said porous distributor plate and said particulate material located thereon, so that said gas migrates through said particulate material and out of said vent but permits said particulate material to move off of said first side of said porous distributor plate.

2. The fluidizer apparatus of claim 1 including a hollow collimator located around said hollow tube to provide a space for said particulate material located between said collimator and said hollow tube;

said collimator having an upper end and a lower end, said lower end being spaced above said porous distributor plate to provide a vertical gap between said lower end and said porous distributor plate to permit said particulate material to pass through said gap and over said porous distributor plate when gas is applied to said porous distributor plate but preventing particulates from passing through said gap upon termination of the flow of gas through said porous distributor plate.

3. The fluidizer apparatus of claim 2 including a delivery chute surrounding said collimator, said delivery chute having an upper end and a lower end and a vent located in said upper end;

said delivery chute further including a second porous distributor plate for partitioning said delivery chute into a first delivery-chute chamber through which said particulate material passes and a second delivery-chute chamber in gaseous communication with said first delivery chute chamber via said second porous distributor plate; and, a source of gas in communication with said second delivery-chute chamber, for delivery of gas at a given pressure to said delivery chute chamber the said given pressure of said gas being such that a gas bearing is provided between the second porous distributor plate and said particulate material as said gas migrates through said particulate material and out of said vent without causing turbulence in the majority of said particulate material passing through said first chamber.

4. The fluidizer apparatus of claim 2 wherein said porous distributor plate is vertically adjustable relative to said lower end of said collimator to adjust said gap between said lower end of said collimator and said porous distributor plate.

5. The fluidizer apparatus of claim 2 including an adjusting means for selectively adjusting the location of said hollow tube within said collimator.

6. The fluidizer apparatus of claim 2 including a plurality of fluidizers located within said collimator.

* * * * *